2,703,762

REINFORCED INORGANIC MOLDED PRODUCTS

Games Slayter, Newark, Ohio, assignor to Owens-Corning Fiberglas Corporation, a corporation of Delaware No Drawing. Application April 28, 1951, Serial No. 223,659

5 Claims. (Cl. 106—105)

This invention relates to the manufacture of substantially inorganic molded products and it relates more particularly to the composition of a dry inorganic molding compound having glass fibers therein for reinforcement and strength and to products produced therefrom.

There has been a need for a molding material compounded chiefly of inorganic substances for use in the manufacture of molded products having the characteristics of high temperature resistance, fireproofness and relatvie inertness so as to provide a molded product capable of use within a temperature range and under conditions not available to the present organic compounds. Inorganic compounds having been produced but in most instances such materials have had relatively little flow and were therefore incapable of molding into intricate shapes and products molded therefrom were characterized by relatively low strength properties.

It is an object of this invention to produce an inorganic composition capable of molding under heat and pressure into a high strength product which conforms to mold shape, and it is a related object to produce a molded product of the type described having fibrous reinforcement to impart markedly improved strength properties.

Another object of this invention is to produce and to provide a method for producing molded products of inorganic materials and it it a related object to produce a product of the type described embodying glass fibers for reinforcement and strength.

A further object is to produce a dry composition formed chiefly of inorganic materials for molding into products having high strength, weather and water resistance and resistance to atmospheric attack and which can be used as a structural material where high temperature resistance and flameproofness constitute some of the requirements.

Broadly defined, the concepts of this invention are embodied in a molding composition containing a hydrated inorganic salt which, under heat and pressure, releases water of crystallization sufficient to dissolve or form a slurry of the salt whereby the composition becomes capable of flow sufficient for molding. Solidification to mold shape may occur from loss of water and cooling down to room conditions but it is preferred to embody herein a metallic oxide or hydroxide which, under conditions of molding, combine with the salt to form a reaction product capable of retaining mold form.

More specifically, invention herein resides in a dry molding compound formulated of glass fibers of relatively short lengths in admixture with magnesium oxide or magnesium hydroxide and a hydrated magnesium sulphate, such as magnesium heptahydrate ($MgSO_4.7H_2O$) which, under heat and pressure, liberates water of hydration in amounts sufficient to produce plastic flow to the composition sufficient to fill the mold and for simultaneous reaction, in whole or in part, to a magnesium oxysulphate type cement. The consolidated product retains mold form and is strengthened beyond expectation by the glass fibers integrated therewith.

The ratio of oxide to sulphate may be varied over a relatively wide range. Calculated on the basis of molecular equivalents, it is preferred to combine one mol of a hydrated inorganic metallic salt with 2–3 mols of the metallic oxide or hydroxide depending on the amount of water of hydration present in the salt and the availability thereof. Satisfactory molding compositions have been produced with the materials being present in the ratio of one mol of the salt to one mol of the oxide or hydroxide ranging down to one mol of the hydrated salt to 9 mols of the oxide or hydroxide. When the hydrated metal salt comprises magnesium sulphate heptahydrate or the like, it is preferred to make use of 3 mols of the magnesium oxide (33 parts by weight) to one mol of the magnesium sulphate heptahydrate (67 parts by weight) but the range may extend from equal molecular equivalents of the oxide and heptahydrate (14 parts MgO to 86 parts $MgSO_4.7H_2O$) to 9 molecular equivalents of magnesium oxide to one molecular equivalent of magnesium sulphate heptahydrate (60 parts MgO to 40 parts $MgSO_4.7H_2O$).

Magnesium oxide suitable in the practice of this invention is selected of brucite manufactured by the Dow Chemical Company from the Luddington, Michigan brine or Sierra magnesia manufactured by the Schundler Company. It will be understood that other magnesium oxides derived from other sources can also be used. Introduction of the magnesium oxide is generally made in powder form and admixed with the magnesium sulphate heptahydrate which is reduced to particle sizes from 40–60 mesh or the like. In the event that the hydrated salt becomes sticky by the heat developed in grinding, it is advisable to introduce the magnesium oxide in powder form in advance thereof.

In the absence of substantial amounts of resinous material or the addition of water, which materials might be capable of imparting flow to the molding compound, a dry compound capable of flow sufficient to fill the mold form under heat and presusre cannot readily be compounded with reinforcement or filler of the type such as wood flour, cellulose fiber, asbestos fiber or other absorbent reinforcing fibers. Without reinforcement, the product molded of the dry inorganic materials is relatively weak and, in many instances, unfit for the purpose for which it was intended. It has been found that reinforcement as to strength can be effected by way of incorporation of glass fibers within certain amounts. The glass fibers do not appear materially to inhibit the moldability of the compound but they seem to tie into the compound in a manner markedly to increase the strength of the molded product. With the addition of 4–6 percent by weight glass fibers, it has been found that the strength of the molded product may be increased as much as five-fold. Thus it has been possible by the incorporation of glass fibers with binder formed of magnesium oxide and hydrated magnesium sulphate to compound a product capable of molding by conventional means into a high strength product which retains the desirable characteristics of an organic system.

Glass fibers for reinforcement are preferably selected of strands formed of 100 or more continuous glass filaments arranged in a compact bundle, or a plurality of such strands twisted or intertwisted together, and cut or chopped to shorter lengths ranging from ⅛–2 inches. Instead, the glass fiber component may be formed of staple fibers which are fibers that are discontinuous in character and attenuated from molten glass streams by a blowing or drawing operation. Such discontinuous fibers may be cut to shorter lengths or a plurality of such fibers may be felted together and then drafted into yarns of substantial lengths which may be cut or chopped to desired shorter lengths for incorporation as an ingredient in the molding composition.

Although it is preferred to make use of glass fiber in amounts ranging from 2–7 percent by weight, it is possible to incorporate up to 10–12 percent depending upon the moisture which can be made available from the hydrated salt under molding conditions.

Certain modifications can be made in the molding composition by introduction of small amounts of pigment to impart color or by the addition of natural oils, synthetic oils, waxes, gums and metal soaps to improve the finish, increase the strength and waterproofness of the final product. Ordinarily such additions should not be made in amounts greater than 2 percent by weight and when more than one modifying ingredient is introduced, the total should not exceed 5 percent of the final product.

In practice, the magnesium sulphate heptahydrate is reduced to fine particle size, as by a grinder of the Muller type. It is preferred to reduce the salt to about 40–60 mesh but variation therefrom within reason can be tolerated. If heat is developed during the grinding operation which tends to release moisture or for other reasons renders the salt sticky, the magnesia powder should be added in advance thereof and mixing continued to achieve uniform distribution. The glass fibers may be mixed therein by suitable means, such as a ribbon type blender or a paddle type blender to form the molding composition. If modifiers, pigments or fillers are to be introduced, addition may be made at any time.

In molding, it is preferred to make use of mold temperatures of about 200–250° F. unless the molding composition is almost immediately placed under positive pressure sufficient to prevent evaporation of the water formed at the temperature of molding. The temperature of the molding material under molding conditions should be above 158° F. but below 200° F. unless such higher temperatures are reached while the material is under positive pressure sufficient to prevent vaporization. Otherwise the loss of moisture from the molding compound will materially affect its flow properties. It is believed that as soon as the magnesium sulphate heptahydrate reaches a temperature in excess of 158° F. water of crystallization is liberated and flow is imparted to the molding composition. Pressure should be applied almost immediately to take advantage of the plastic stage before the chemical reaction for setting the molding composition takes place. Pressures in the range of 1000–6000 pounds per square inch are preferred but higher pressure up to about 25,000 pounds per square inch may be used where necessary to fill the mold or where such higher pressures can be made available.

By way of illustration, but not by way of limitation, the following are examples setting forth the practice of this invention:

Example 1

Ingredients:
    31 percent magnesium oxide
    64 percent magnesium sulphate heptahydrate
    5 percent glass fiber strands cut to 1 inch lengths The magnesium sulphate heptahydrate is ground to a particle size of 40–60 mesh. The magnesia powder is added in advance of reduction of the salt to a sticky stage and grinding and mixing is continued until the two materials are uniformly distributed in each other. The glass fibers are then introduced and mixed therewith in a ribbon type blender.

The molding composition may be molded to predetermined shape in metallic molds heated to 220° F. and under pressure of 6000 pounds per square inch. Setting sufficient to permit removal will take place in from 1–10 minutes.

Test bars molded of the above composition under the conditions described give dry flexural strengths of about 4800 pounds per square inch and wet flexure strength after 7 days immersion in water of 4100 pounds per square inch.

The reinforcing strength introduced by the presence of glass fibers as an element of molding composition is illustrated by the following compositions prepared and molded under similar conditions.

Example 2

32 percent magnesia
64 percent magnesium sulphate heptahydrate
4 percent glass fibers in the form of strands cut to ½–1 inch lengths

Example 3

33 percent magnesia
67 percent magnesium sulphate heptahydrate

The compositions of Examples 2 and 3 were formed into a molding compound as described in Example 1 and test bars were molded therefrom at a platen temperature of 220° F. and pressure of about 4000 pounds per square inch.

Bars molded of the composition of Example 3 gave a dry flexure strength of 700 pounds per square inch and wet flexure strength of 400 pounds per square inch while bars molded of the composition of Example 2, embodying glass fiber reinforcement, had a dry flexure strength of 3800 pounds per square inch and a wet flexure strength of 1900 pounds per square inch. This represents a fivefold increase which is attributed entirely to the unique combination developed by the presence of glass fibers.

Example 4

A molding composition is prepared of 41 percent magnesium oxide, 49 percent magnesium sulphate heptahydrate and 4 percent glass fibers in the form of discontinuous fibers chopped to ½ inch lengths. This represents a ratio of 6 molecular equivalents of magnesium oxide to 1 molecular equivalent magnesium sulphate heptahydrate. The molding composition was prepared and molded in accordance with the description set forth in Example 1.

Example 5

Molding compounds may also be prepared of materials present in the ratio of 13 percent magnesium oxide, 81 percent magnesium sulphate heptahydrate and 6 percent glass fibers. This formulation represents the presence of the materials in the ratio of 1 molecular equivalent magnesium oxide to 1 molecular equivalent magnesium sulphate heptahydrate.

Example 6

A molding composition is prepared by combining 37 percent magnesium hydroxide, 58 percent magnesium sulphate heptahydrate and 5 percent glass fiber strands chopped to ¼–1 inch lengths. In this composition, prepared in accordance with the description in Example 1, the magnesium hydroxide appears to release an equivalent of water under molding conditions for conversion of the magnesium oxide which reacts almost immediately with the sulphate to form the magnesium oxysulphate type binder.

Example 7

Ingredients:
    30 percent magnesia
    63 percent magnesium sulphate heptahydrate
    5 percent glass fibers in the form of strands cut to 1 inch lengths
    2 percent chrome yellow pigment The materials are formed into a molding composition in accordance with the description of Example 1. The pigment imparts an attractive yellow color to the molded product.

Example 8

Ingredients:
    28 percent magnesium oxide
    63 percent magnesium sulphate heptahydrate
    4 percent glass fiber in the form of strands chopped to about ½ inch lengths
    2 percent chrome yellow
    3 percent carnauba wax Although not equivalent, other salts may be used in place of the hydrated magnesium sulphate so long as the salt is capable of releasing water of crystallization at a temperature below 200° F. under atmospheric conditions and reaction with the oxide to form a set reaction product. Representative of such salts are alum $$Al_2(SO_4)_3 \cdot (NH_4)_2 SO_4 \cdot 24H_2O$$

ferric ammonium alum, $Fe_2(SO_4)_3 \cdot (NH_4)_2 \cdot 24H_2O$, and barium oxysulphate.

Although not capable of substitution for the hydrated sulphates in the described reaction, some of the concepts of this invention may be practiced with other hydrated salts so long as the salt is capable at temperatures below 200° F. under atmospheric conditions of releasing water of crystallization for solution of the salt or formation of a slurry capable of plastic flow under molding conditions. Where reaction does not take place with other elements to form a set reaction product, hardening may result from elimination of water coupled with the reduction of temperature to room conditions after molding. Representative of salts or minerals hereunder include calcium borate, copper sulphate ($CuSO_4 \cdot 5H_2O$), calcium chloride ($CaCl_2 \cdot 6H_2O$), zinc oxide minerals and the like.

The compositions herein described and claimed comprise an inorganic thermosetting type compound capable of molding under heat and pressure to intricate shape. A product molded in accordance with this invention is characterized by strengths higher than has heretofore been contemplated for inorganic molding compositions capable of substantial permanence under high temperature, high moisture and atmospheric conditions coupled with the many other desirable properties of inorganic systems, such as heat resistance, flame resistance, inertness and the like. Preparation of a molding compound in accordance with this invention makes available a relatively low cost composition formulated of materials which are readily available and which can be compounded by relatively low cost systems already available in the trade.

It will be understood that changes may be made in the details of composition, the method of handling and molding without departing from the spirit of the invention, especially as defined in the following claims.

I claim:

1. The method of producing an inorganic molded product comprising the steps of loading the mold form with a dry mixture consisting essentially of glass fibers in amounts ranging up to 12 percent by weight in combination with 1–9 molecular equivalents of a compound selected from a group consisting of magnesium oxide and magnesium hydroxide to 1 molecular equivalent of a hydrated inorganic magnesium sulphate from which water of crystallization is releasable in sufficient quantity for plasticization when heated above 160° F., molding the compound in the mold form at a temperature ranging from 160–200° F. and a pressure ranging from 1000–6000 pounds per square inch.

2. The method of producing an inorganic molded product comprising the steps of loading the mold form with a dry mixture consisting essentially of glass fibers in amounts ranging from 2–7 percent by weight in the form of bundles cut to lengths ranging from ⅛–2 inches in combination with 1–9 molecular equivalents of magnesium oxide to 1 molecular equivalent of magnesium sulphate heptahydrate, molding the compound under heat and pressure ranging from 160–200° F. and 1000–6000 pounds per square inch.

3. The method of producing an inorganic molded product comprising the steps of loading the mold form with a dry mixture consisting essentially of glass fibers in amounts ranging from 2–7 percent by weight in the form of bundles cut to lengths ranging from ⅛–2 inches in combination with 1–9 molecular equivalents of magnesium hydroxide to 1 molecular equivalent of magnesium sulphate heptahydrate, molding the compound under heat and pressure ranging from 160–200° F. and 1000–6000 pounds per square inch.

4. The method of producing an inorganic molded product comprising the steps of loading the mold form with a dry mixture consisting essentially of glass fibers in amounts ranging from 2–7 percent by weight in the form of bundles cut to lengths ranging from ⅛–2 inches in combination with 2–3 molecular equivalents of magnesium oxide to 1 molecular equivalent of magnesium sulphate heptahydrate, molding the compound under heat and pressure ranging from 160–200° F. and 1000–6000 pounds per square inch.

5. The method of producing an inorganic molded product comprising the steps of loading a mold form with a dry mixture consisting essentially of glass fibers in amounts ranging up to 12 percent by weight in admixture with 1–9 molecular equivalents of a compound selected from the group consisting of magnesium oxide and magnesium hydroxide to one molecular equivalent of a hydrated inorganic magnesium sulphate from which water of crystallization is releasable in sufficient quantity for plasticization upon molding at elevated temperature, and molding the compound in the mold form under pressure and at an elevated temperature ranging from 160–200° F. to release the moisture of crystallization from the hydrated inorganic magnesium sulphate.

References Cited in the file of this patent

UNITED STATES PATENTS

| Number | Name | Date |
|---|---|---|
| 126,049 | Hahn | Apr. 23, 1872 |
| 705,650 | Conti et al. | July 29, 1902 |
| 872,375 | Rueff | Apr. 19, 1907 |
| 909,171 | Ellis | Jan. 12, 1909 |
| 1,720,972 | Seaton | Apr. 15, 1925 |
| 2,130,091 | Kershaw | Sept. 13, 1938 |
| 2,175,715 | Denning | Oct. 10, 1939 |
| 2,543,752 | Austin et al. | Mar. 6, 1951 |
| 2,572,688 | Austin | Oct. 23, 1951 |
| 2,598,102 | Baxter | May 27, 1952 |
| 2,628,915 | Austin et al. | Feb. 17, 1953 |

FOREIGN PATENTS

| Number | Country | Date |
|---|---|---|
| 4,223 | Great Britain | Apr. 28, 1894 |
| 15,102 | Great Britain | June 23, 1914 |
| 497,621 | Great Britain | Dec. 22, 1938 |